March 26, 1957     P. SCHLUMBOHM     2,786,577
LEACHER, ESPECIALLY FOR MAKING COFFEE OR TEA
Filed Jan. 8, 1954
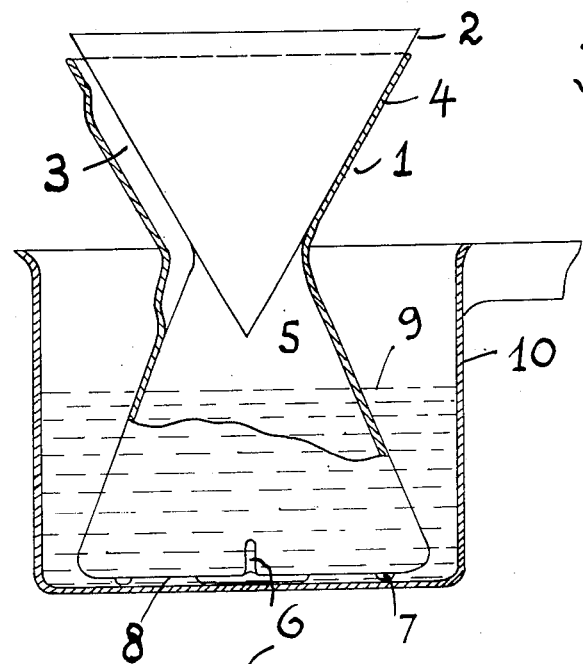
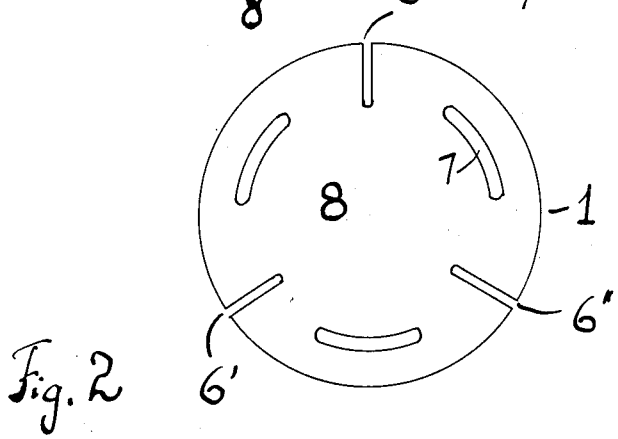
INVENTOR.

United States Patent Office 2,786,577
Patented Mar. 26, 1957

2,786,577

LEACHER, ESPECIALLY FOR MAKING COFFEE OR TEA

Peter Schlumbohm, New York, N. Y.

Application January 8, 1954, Serial No. 403,013

1 Claim. (Cl. 210—160)

The present invention refers to a device for leaching tea or coffee, alternatively in combination with filtration or in combination with straining to separate the coffee grounds or the tea leaves from the brew after the leaching period.

The invention is illustrated by way of examples in Fig. 1 and Fig. 2 of the accompanying drawings.

Fig. 1 shows a leacher resting on its bottom walls, removably inserted in a container designed to hold the brew; shown partly in vertical section, partly in view.

Fig. 2 is a bottom view of the leacher of Fig. 1.

The new leacher of my invention is a flask-like structure having a bottom section, a center section and an open top section walled by continuous walls which in the bottom section are perforated to form a strainer and which in the top section form a funnel to receive a filtering element such as a filterpaper cone. The walls of the center section cooperate with the perforated bottom walls to form a leaching space for a turbulent flotation of tea leaves when the leacher is moved within the hot water held in the brew container.

In Fig. 1 the leacher 1 holds in its upper section where the walls form a funnel 4—in this example a 60° funnel—a filterpaper cone 2. The bottom wall 8 is perforated, in this example by three slots which extend also into the sidewalls 6, 6' and 6". The bottom walls also have three ridges 7 to space the slots from the bottom wall of the container 10, so that the hot water or the brew 9 can freely flow through the slots when—in making tea—the leacher holds tea leaves and is moved up and down within container 10. When making coffee, the coffee is placed on the filter 2, water is added from a kettle and the filtered coffee flows through the slots into container 10.

When applying the leacher with a filter 2 the space 5 of the center section must be vented. The venting has to be effected for two reasons: When the filtered brew has reached a level to cover the slots 6, 6', 6" the air in space 5 must leave its space to be displaced by the brew. When at the end of the filtration period the leacher is lifted out of the container 10 and out of the brew 9, air has to be brought back into space 5 to allow the brew to leave that space. Both functions of air venting are made possible by the vent groove 3 in the sidewalls of the upper section of the leacher.

The leacher shown in Fig. 1 has the features of my Chemex Coffeemaker, U. S. Patent 2,241,368, except for the perforated bottom wall. However, by providing these bottom perforations a completely different apparatus is created, which performs in a different manner different operations.

The three slots shown are only an example of perforating the bottom wall to form a strainer. A sieve-like structure as part of the bottom wall would have the same effect.

I claim as my invention:

Convertible device for making tea comprising a walled structure with a bottom wall, side walls walling a lower section and an upper section and an open top, which is the open top of a conical filter-funnel formed by the side walls of the upper section, said bottom wall being perforated to form a strainer; with a filter cone in the filter-funnel.

References Cited in the file of this patent

UNITED STATES PATENTS

| | | |
|---|---|---|
| 235,044 | Thompson | Nov. 30, 1880 |
| 865,965 | Earp-Thomas | Sept. 10, 1907 |
| 2,241,368 | Schlumbohm | May 6, 1941 |
| 2,345,265 | Jepson et al. | Mar. 28, 1944 |
| 2,360,570 | Mattoon | Oct. 17, 1944 |
| 2,470,323 | Smith | May 17, 1949 |